UNITED STATES PATENT OFFICE.

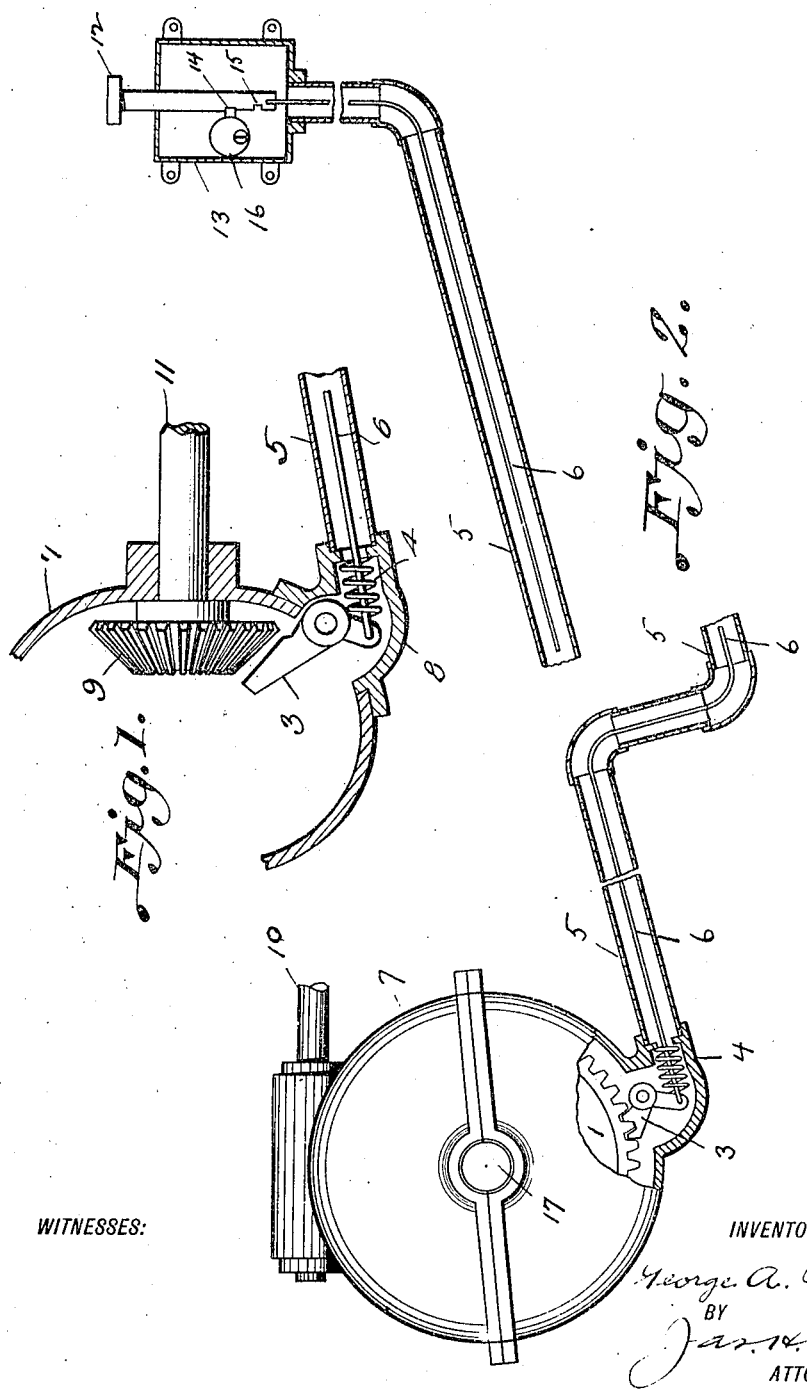

GEORGE A. BIGELOW, OF PORTLAND, OREGON.

LOCK FOR AUTOMOBILES OR POWER-DRIVEN VEHICLES.

1,298,283.	Specification of Letters Patent.	Patented Mar. 25, 1919.

Application filed October 1, 1917. Serial No. 194,128.

*To all whom it may concern:*

Be it known that I, GEORGE A. BIGELOW, a citizen of the United States, and a resident of Portland, in the county of Multnomah and State of Oregon, have invented a new and useful Lock for Automobiles or Power-Driven Vehicles, of which the following is a specification.

My invention relates to that class of automobile locking devices which are permanently attached to the automobile and its object is to provide a simple and effective means of preventing the rotation of the rear axle of the atuomobile when the device is in operative position, accomplishing this result by locking the transmission gears.

Figure 1 is a partial sectional view of the transmission case and bevel gear drive showing application of locking device thereto; also indicating how the device may be applied to a car not originally so equipped. Fig. 2 is a partial sectional elevation showing the assembly of a complete locking device applied to a worm gear drive.

In Fig. 2, the worm driven by the shaft 10 drives the worm wheel 1 keyed to the rear axle 17. At the bottom of the split transmission case 7 is a recess in which is located the locking pawl 3. This pawl is of bell crank pattern, one arm of which carries two or three teeth of the same pitch as the gear wheel and is capable of meshing with it; the other arm is attached to a cord or cable 6, the spring 4 tending to resist any tension or pull on the cable and keep the pawl 3 in engagement with the gear wheel 1. Fig. 2 also shows the arrangement when the device is actuated from the driver's seat. The lock box 13 however can be located at any convenient place on the vehicle, even behind, and in close proximity to the transmission case. The pipe 5 which incloses the cable 6 is case hardened as well as the lock box 13, in fact, any part of the apparatus that is exposed to attack can be hardened to resist a file, hack saw or drill. As has been stated one end of the cable is attached to an arm of the pawl 3 and the other end of the cable is fastened to a pull bar 12, Fig. 2, with notches 14 and 15 therein to receive the bolt of the lock 16. This is all inclosed in the lock box 13 and only a small opening left in which to insert the key into the lock 16.

In the position shown with the bolt in the notch 14, the spring 4 operates to hold the pawl 3 in mesh with gear wheel 1 and the automobile is locked, it being impossible even to move the vehicle as the transmission gears are locked and the rear axle cannot be rotated. If then the bolt of lock 16 be thrown back and the pull bar 12 released so that it can be raised and the notch 15 brought into engagement with the bolt of lock 16, the cable 6 will pull on the arm of the pawl 3, the spring 4 will be compressed and the pawl will become disengaged from the gear wheel 1, permitting same to perform its functions and rotate the rear axle of the automobile. This is the position of the device when the machine is running. The pull bar is up when the pawl is out of operative position and down when the pawl is in operative position. Preferably the device is put on the vehicle when the automobile is being made at the factory, but it can be attached to cars that have not been so equipped. An opening is cut in the transmission case and the part 8, Fig. 1, is welded to the transmission case resulting in a very satisfactory locking mechanism and one that cannot be tampered with. I have shown a preferred form of my device but it is manifest that many variations may be made therein without departing from the spirit of my invention.

I claim,—

1. In a locking device for power driven vehicles, in combination with the transmission gear on the rear axle, of a pawl capable of meshing with the gear, a spring which tends to keep the pawl in mesh, a cable attached to one arm of the pawl, a case hardened tube surrounding said cable, a pull bar attached to the other end of the cable and locking means to engage the pull bar.

2. In a locking device for power driven vehicles, in combination with one of the transmission gears, of a pawl capable of meshing with the gear, a spring which tends to keep the pawl in mesh, a cable attached to one arm of the pawl, a pull bar attached to the other end of the cable and locking means to engage the pull bar.

GEORGE A. BIGELOW.